Patented Oct. 22, 1929

1,732,886

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

ARTICLE OF RUBBER AND METHOD OF MAKING SAME

No Drawing. Application filed April 22, 1927, Serial No. 185,917. Renewed March 15, 1929.

This invention relates to articles composed of rubber and other materials, such as metals, glass, porcelain, bakelite, etc., and to a method of manufacturing such articles. It has for an object to provide a method for making such a composite article with the rubber composition united to the other material with a greater strength than is obtainable by methods now commonly employed.

Satisfactory unions of rubber to certain metals which have generally been considered non-adhesive with respect to rubber, such as tin, lead, zinc, Monel metal and admiralty bronze, have been heretofore difficult of attainment by the methods employed in the industries. A purpose of the present invention is to provide a practical industrial method for securing firm and strong union of rubber compositions to metals of the character designated, which method shall also be applicable in the bonding of rubber to other materials.

It has heretofore been proposed to utilize certain thermoplastic rubber isomers as bonding film between rubber and other materials when applied in the manner commonly employed with rubber cements. The present invention is based upon the discovery that tacky, thermoplastic rubber isomers will produce stronger and more durable bonds between rubber and metal where the rubber isomer is applied to the metal surface in the form of a thin film or coating, as by spraying or otherwise spreading the rubber isomer in solution uniformly over the surface of the metal, and thereafter subjecting the coated metal to heat for a sufficient time and at a sufficient temperature to produce a relatively dry tough film. Rubber may now be applied to this film which should preferably, altho not necessarily, be wetted with a rubber solvent, a rubber cement, a solution of the rubber isomer, or other material mutually absorbable in rubber and the rubber isomer, and the rubber vulcanized in contact with the baked film-coated metal.

The rubber isomer constituting the baked film in the process of this application may be prepared in any suitable manner. In a preferred embodiment of my invention I admix into 100 parts by weight of rubber, 7.5 parts by weight of phenol sulfonic acid and subject the mix to heat, as in an oven, maintained at 140° C. for six hours. The principal constituent of the resulting product is found to have the same empirical formula as rubber and to be less unsaturated than rubber and consequently to be an isomer of rubber. Rubber may be treated with a wide variety of isomerizing agents in accordance with methods heretofore devised, and it is to be understood that the term "rubber isomer" as employed in this specification includes rubber isomers of the character hereinabove referred to however produced, and whether or not admixed with other ingredients.

I have also found that accelerators of film-formation such as the so-called drying oils and other driers may be admixed with the rubber isomers to facilitate the formation of the metal adhering film. Among these materials I have found that tung oil, linseed oil, and other drying oils, and such driers as magnesium oxide, manganese linoleate and the like are particularly suitable.

In carrying out the process of this application, the tacky rubber isomer is dissolved in an organic solvent such as benzol, and the drying agents added thereto. The metal surface to which the rubber is to be adhered is cleansed, as by sandblasting or other suitable method of cleansing, and the rubber isomer solution is then spread in a thin film upon the cleansed metal surface. The film of the rubber isomer should cover every portion of the metal surface with a thin coherent coating. The coated metal is now subjected to heat, as in a dry heat oven. I have found that a dry adherent film will normally be formed in from 30 to 120 minutes when heated in an oven at 260° F, the variation in time being determined by the amount and character of the drying agent employed.

A rubber composition having desired characteristics, either vulcanizable or unvulcanizable, may be adhered to the baked film coated metal by merely placing the two in contact and subjecting the assemblage to heat and pressure. Where a vulcanizable rubber composition is employed, the heating should be for such time and at such temperature as to effect a proper cure of the rubber composition.

It is desirable in many instances to treat the baked film or the rubber composition, or both, with an organic solvent, such as benzol, prior to placing the rubber on the metal, and other liquid materials, such as rubber cement or a solution of the rubber isomer, which are mutually soluble in or adsorbable with respect to the baked film and to rubber, may be employed in place of the organic solvent.

The composite products formed in accordance with the above described method have been found to have the rubber adhered to the metal with such tenacity that the rubber will tear internally before the bond to the metal will give way.

It is to be understood that the process herein is described in connection with a preferred embodiment thereof and that numerous modifications in the employment of drying agents, which however are not essential to this process, in the times and temperatures of baking the film coating, in the character of the rubber to be adhered to the baked film, and in the other details herein specified, may be resorted to without departing from the fundamental principles of the invention as herein set out.

I claim:

1. The method of adhering rubber to other materials which comprises applying to a surface of such material a thin film of composition consisting primarily of a tacky rubber isomer, heating the coated material to form a relatively dry film thereon, and thereafter heating a rubber composition in pressure contact with said film-coated material.

2. The herein described process of adhering a rubber composition to metal which comprises applying to the metal surface a thin continuous film of a composition containing in major part a tacky rubber isomer, heating the coated metal to convert the composition to a relatively dry film, and vulcanizing a rubber composition in contact with the film-coated metal.

3. The method of adhering a rubber composition to a backing material which comprises applying to the surface of the material a thin coherent film of a composition comprising a rubber isomer, an organic solvent and an accelerator of film formation, heating the coated material to form a relatively dry film thereon, and thereafter vulcanizing rubber in contact with said film coated material.

4. The method of adhering a rubber composition to metal which comprises applying to the metal surface a thin coherent coating consisting in part of a tacky rubber isomer, heating the film coated metal to form thereon a relatively dry film, then moistening the film with moistened liquid material absorbable with respect to rubber and thereafter applying a rubber composition to the film coated metal with heat and pressure.

5. The method of adhering a rubber composition to a backing material which comprises applying to the surface of the material a thin coherent coating consisting in part of a tacky rubber isomer, heating the film coated material to form thereon a relatively dry baked film, coating the baked film with a solution of a rubber isomer, and thereafter applying a rubber composition to the film coated material with heat and pressure.

6. An article of manufacture comprising rubber and a backing material integrally united by an intermediate film of a rubber isomer baked on the backing material prior to the application of rubber thereto.

7. The method of adhering rubber to other materials which comprises applying to a surface of such material a thin film of a composition containing a thermoplastic rubber derivative and a drying oil, baking the film, and thereafter bonding a rubber composition to the material by pressure with said baked film.

8. The method of adhering rubber to other materials which comprises applying to a surface of such material a thin film of a composition containing a thermoplastic rubber isomer and a drying oil, baking the film, and thereafter bonding a rubber composition to the material by pressure with said baked film.

9. The method of adhering rubber to other materials which comprises applying to a surface of such material a thin film of a composition containing a rubber derivative and a drier, baking the film, and thereafter bonding a rubber composition to the material by pressure with said baked film.

In witness whereof I have hereunto set my hand this 20th day of April, 1927.

HAROLD GRAY.